(12) United States Patent
Jiang

(10) Patent No.: US 7,720,197 B2
(45) Date of Patent: May 18, 2010

(54) HIGH INTENSITY X-RAY BEAM SYSTEM

(75) Inventor: Licai Jiang, Rochester Hills, MI (US)

(73) Assignee: Rigaku Innovative Technologies, Inc., Auburn Hills, MI (US)

( * ) Notice: Subject to any disclaimer, the term of this patent is extended or adjusted under 35 U.S.C. 154(b) by 0 days.

(21) Appl. No.: 12/130,574

(22) Filed: May 30, 2008

(65) Prior Publication Data

US 2009/0296889 A1 Dec. 3, 2009

(51) Int. Cl.
*G21K 1/06* (2006.01)

(52) U.S. Cl. .......................................... 378/84; 378/145

(58) Field of Classification Search .................... 378/70, 378/84, 85, 145; 359/846
See application file for complete search history.

(56) References Cited

U.S. PATENT DOCUMENTS

| 5,497,008 | A | 3/1996 | Kumakhov |
| 6,069,934 | A * | 5/2000 | Verman et al. ................. 378/73 |
| 7,317,784 | B2 * | 1/2008 | Durst et al. .................. 378/124 |
| 7,415,096 | B2 * | 8/2008 | Sherman ....................... 378/84 |
| 2008/0095319 | A1 | 4/2008 | Grodzins et al. |

* cited by examiner

*Primary Examiner*—Jurie Yun
(74) *Attorney, Agent, or Firm*—Brinks Hofer Gilson & Lione

(57) ABSTRACT

An x-ray optical system for producing high intensity x-ray beams. The system includes an optic with a surface formed by revolving a defined contour around a revolving axis that is different than the geometric symmetric axis of the optic. Accordingly, the system may use a source that has a circular emission profile or a large source to provide increased flux to a sample.

31 Claims, 5 Drawing Sheets

US 7,720,197 B2

HIGH INTENSITY X-RAY BEAM SYSTEM

BACKGROUND

The present invention relates to x-ray optical systems.

Researchers have long employed focusing x-ray optics in x-ray diffraction experiments to increase the flux incident on a sample and to thereby increase the signal to noise ratio. A focusing optic increases the flux through a sample by directing a large number of photons from a source. Moreover, by positioning a detector near or at the focus of the optic, resolution of the system can be greatly improved.

The intensity of conventional x-ray beam systems, however, is limited by the brilliance of the source that can be achieved without damaging the source target. Although a large optic, such as an ellipsoidal optic or a parabolic optic with a large capture angle, can deliver high flux, the cross section of the x-ray beam and divergence tends to be too large to be fully utilized. Improving the performance of an x-ray beam system by increasing the brilliance of the source is typically limited or too costly.

In view of the above there is a need for an improved x-ray optical system that produces high-intensity x-ray beams.

SUMMARY

In satisfying the above need, as well as overcoming the enumerated drawbacks and other limitations of the related art, the present invention provides an x-ray optical system for producing high intensity x-ray beams. The system includes an optic with a surface formed by revolving a defined contour around a revolving axis that is different than the geometric symmetric axis of the optic and a source that has a circular emission profile.

The axis can be a beam axis, the cord of geometric contour of the optic, or a line near the cord of the geometric contour. The optic can be a total reflection mirror or a reflector with performance enhancement coating such as a multilayer coating. The source can be a rotating anode or a sealed tube x-ray generator.

Further features and advantages will be apparent from the following description and from the claims.

DETAILED DESCRIPTION

Figure 1:
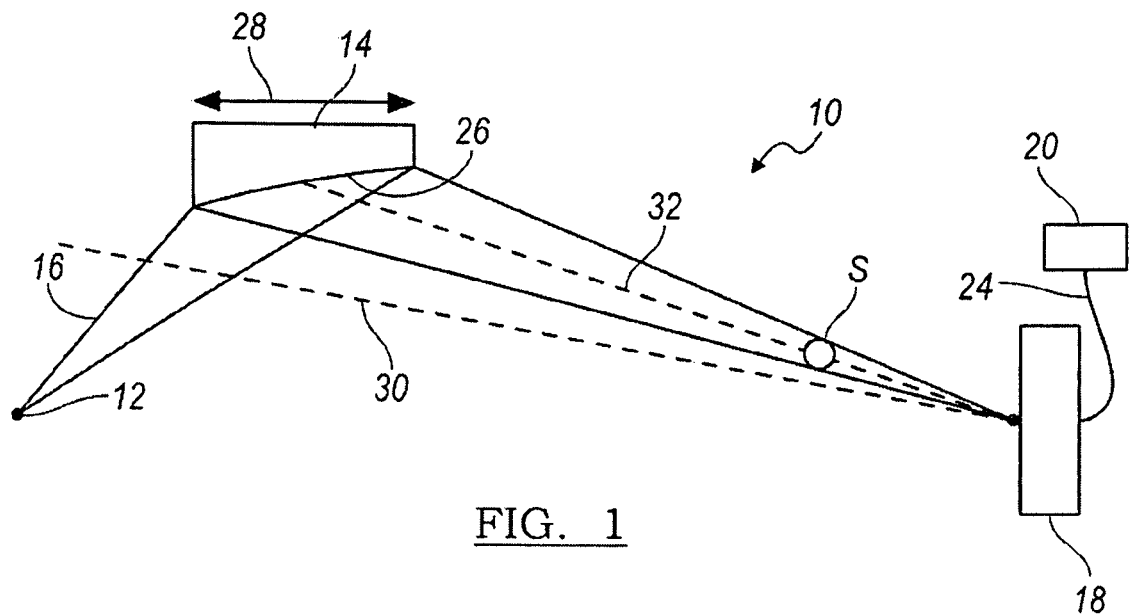
FIG. 1 is a schematic drawing of an x-ray optical system in accordance with the present invention.

The invention provides x-ray optical system that produces high intensity x-ray beams. In accordance with an embodiment of the invention, FIG. 1 illustrates an x-ray optical system 10 including an x-ray source 12 and an optic 14. The x-ray source 12 can be a laboratory source, such as a high brilliance rotating anode, a sealed tube x-ray generator, or a microfocusing source. The optic 14 can be a reflector with a performance enhancement coating, such as a multilayer coating, a total reflection optic, or an x-ray reflective crystal.

In operation, the source 12 emits an x-ray beam 16 toward the optic 14. The optic 14 includes an optical surface 26 that directs the x-ray beam 16 onto a sample S, for example by focusing or collimating the x-ray beam 16. The optic 14 may serve to converge the x-ray beam 16 as it is directed onto the sample S thereby increasing the amount of flux provided to the sample S. The detector 18 may collect radiation 22 from the x-ray beam 16 that is transmitted and diffracted through the sample S. The detector 18 may provide a signal 24 to a processor 20 corresponding to the radiation 22 collected by the detector 18. The optic 14 may have various geometric contours along the optical surface 26 in the direction of x-ray beam propagation. Such contours may include elliptical, parabolic, and hyperbolic surfaces, although other surfaces may also be used.

The optical surface 26 is formed by revolving a defined contour around a revolving axis 30. Typically, the contour is revolved around the geometric symmetric axis of the contour. However, in the embodiment described, the optical surface 26 is formed by rotating the contour around a revolving axis 30 that is different than the geometric symmetric axis of the contour. The revolving axis 30 is chosen to provide a beam with a small cross section. Such an axis can be the beam axis 32, a cord of the geometric contour, or a line near the cord of the geometric contour. In addition, the revolving axis may be in plane with the geometric axis of the contour.

Since the optical surface 26 will be revolved about the revolving axis 30, the profile of the optical surface 26 will be circular in a cross-section perpendicular to the revolving axis. As such, the cross section will not be perpendicular to the geometric axis of the surface.

The optic 14 may have various geometric profiles longitudinally along the length of the optic 14, depending on the requirements of the particular application. In certain implementations, the optic 14 is a semi-circular concave multilayer focusing/collimating optic and the source 12 has a circular emission profile. In other implementations, the optic 14 is a full circular convex multilayer focusing/collimating optic. In yet other implementations, the optic surface is a total reflection surface produced, for example, by controlled pulling from a glass tubing or by replicating technology.

Figure 2:
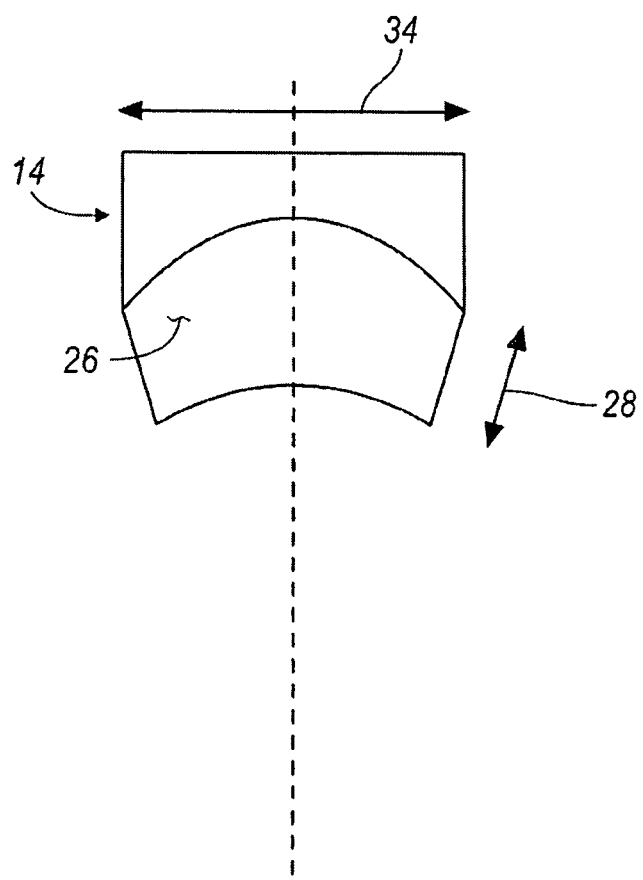
FIG. 2 is perspective view of an optic of the x-ray optical system of FIG. 1.

A particular feature of the system 10 is that it provides increased flux while maintaining the same beam divergence or convergence. As described above, optical surface 26 of the optic 14 is a 2D surface. This may also be referred to a 3D surface meaning the surface is in 3-dimensional space. The optical surface 26 can be described by its curvature in the "longitudinal" direction 28 and in the "cross" direction 34 (which is perpendicular to FIG. 1 and shown as 34 in FIG. 2). The optical surface 26 along the longitudinal direction 22 can be any geometry surface such as elliptical, parabolic, or hyperbolic curves. The optical surface 26 in the cross direction 34 is formed by revolving the longitudinal curve about a revolving axis 30.

In conventional systems, if the revolving axis 30 is defined by two focuses of an elliptical curve, it is an ellipsoidal surface, or if the axis 30 is defined by the symmetric axis of a parabola, it is a parabolic surface. However, the surface 26 is formed by revolving the longitudinal curve (or contour) around an axis 30 that is equal or close to the intended beam axis 32. Thus, rather than producing a large ring with conventional ellipsoidal/paraboloidal surfaces, the optic 14 delivers a small ring, a semi-circular ring, or a round beam if the revolving axis 30 is the beam axis 32. The specific shape of the x-ray beam 16 depends on the relative relationship between the revolving axis 30 and the contour.

The optic 14 can have a concave surface, a convex surface, or a combination of a concave surface and a convex surface. If the optic 14 is concave surface, the surface many not be a fully closed surface (depending on where the revolving axis is). If the optic 14 is convex, a $2\pi$ surface can be formed. The source 12 may have a circular or a partial circular profile. The diameter of the partial-circular source (or full circular source) profile depends on the optic design. If the optic is a combination of convex and concave, one part can be a $2\pi$ surface while the other part may be a semi-circular $\pi$ surface.

Figure 3:
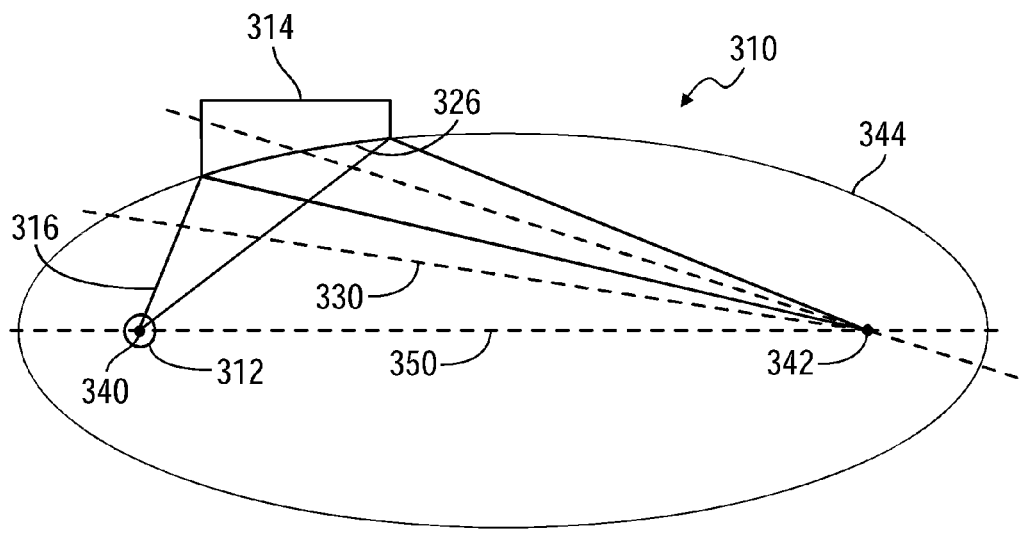
FIG. 3 is a schematic drawing of an elliptical x-ray optical system in accordance with the present invention.

A system 310 utilizing an optic 314 with an elliptical surface 326 is provided in FIG. 3. In an elliptical system, the origin of the x-ray source 312 is located at one focus 340 of the ellipse 344 while the detector is generally located at or near the second focus 342 of the ellipse 344. The system has a revolving axis 330 different from the geometric axis 350. The revolving axis 330 passes the second focal point Typical systems use an optic with a surface that is rotated about the geometric symmetric axis 350 of the contour. (The revolving axis 330 is the same as the geometric axis 350). In the case of an elliptical surface 326, the geometric symmetric axis 350 passes between the two focuses 340, 342. This geometry works particularly well with an x-ray source that emulates a point source.

Figure 4:
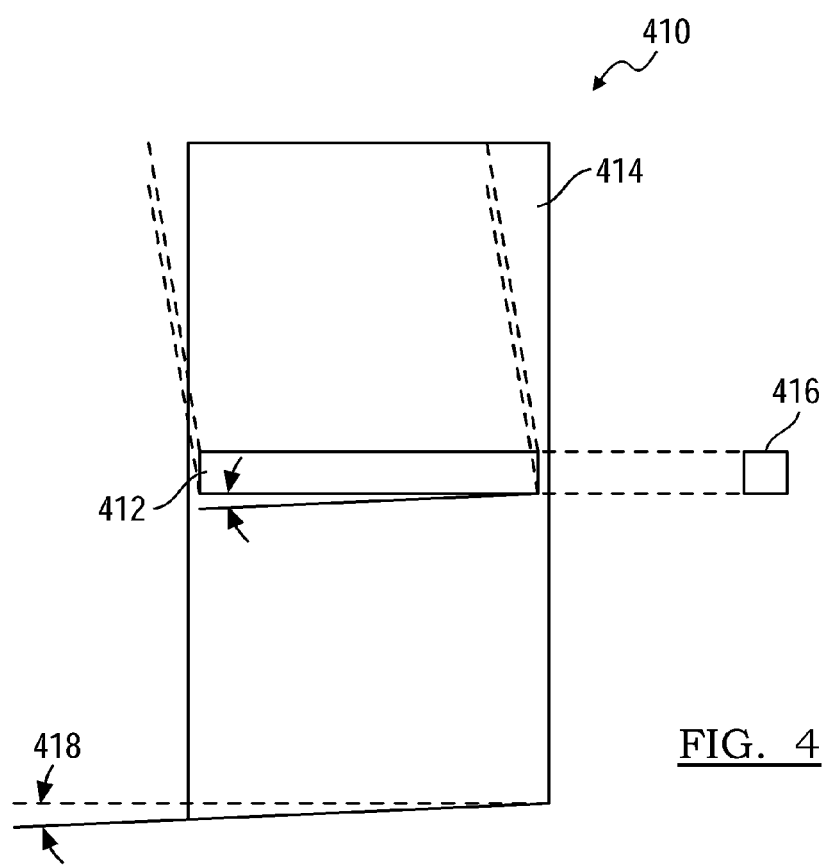
FIG. 4 is a perspective view of a target for an x-ray point source.

However, point sources are limited in the amount of power per unit area that can be generated. This is further illustrated in FIG. 4. A typical x-ray point source 410 generates a line 412 on a target 414 that is then viewed at a very shallow angle 418 that may appear as a point source 416. However, to increase the brilliance of the source, more energy must be projected into the area. Since the tolerable heat generated by the electrons projected on the target 414 is limited, it is useful to generate an optical system that can use a large area than a point source. For example, an x-ray source with a circular emission profile may be used to maintain a brilliance not much lower than a point source, but can be loaded with much higher power due to the larger area.

Figure 5:
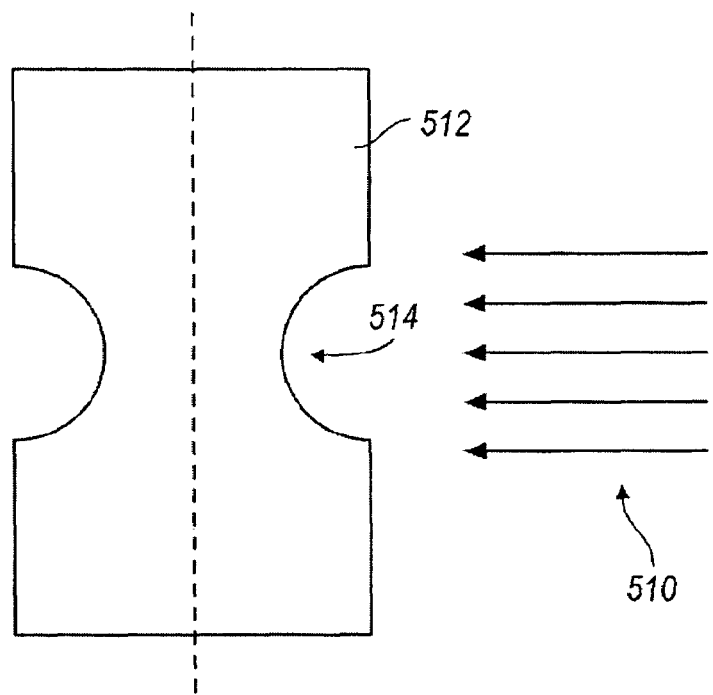
FIG. 5 is a front view of a target for a circular rotating x-ray source.

As shown in FIG. 5, a circular x-ray source may be developed by projecting accelerated electrons 510 onto a rotating anode target 512 with a semi-circular profile 514. In this scenario, the x-ray source and the optic will need to be designed as a matching pair based on the particular configuration. One embodiment, may include a partial-circular concave multilayer optic and a source with a partial circular emission profile. Another embodiment may include a full circular convex/concave multilayer focusing optic and a source with a circular emission profile. Yet another embodiment, may include either geometry of the sources or optic but utilizing a total reflection surface, which may be formed by controlled pulling from a glass tubing. It is also valid that such an optic would be able to take advantage of a large source provided that source size is large enough the perceived circular source is included within the large source.

Figure 6:
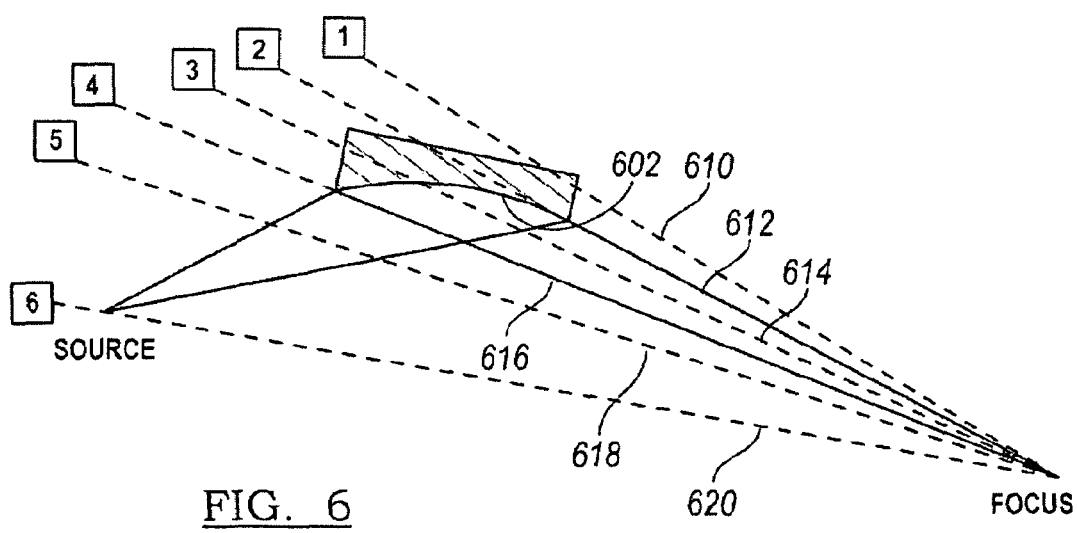
FIG. 6 is a schematic view illustrating a range of revolving axis positions for the optic of FIG. 3.

Referring now to FIG. 6, there is shown a schematic relationship between the revolving axis and the resulting reflecting surface 602. In each case shown, the axis of rotation may pass through the focus 606 and be aligned in plane with the geometric symmetric axis of the contour. If the axis of rotation is beyond the far edge of the reflecting surface 602 as shown by revolving axis 610, the reflecting surface 602 is a convex surface, and the cross section of the beam formed has a ring with a center hole. If the revolving axis rotation is at the far edge of the reflecting surface 602 as shown by revolving axis 612, the reflecting surface 602 is a convex surface, and the beam formed has a partial or full round cross section, depending on the revolving angle.

Figure 7:
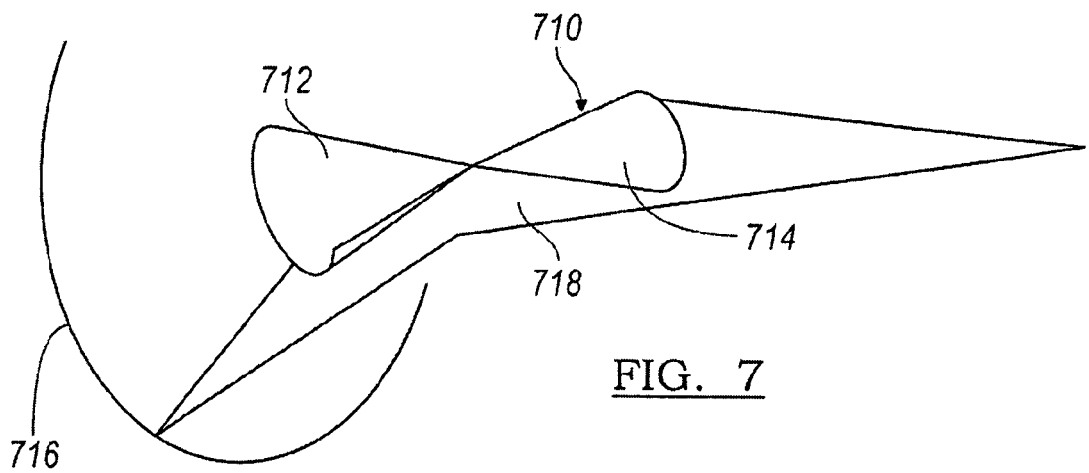
FIG. 7 is a schematic view of an x-ray optical system illustrating a convex and concave optic.

The reflecting surface 602 may be a combination of a concave surface and a convex surface, if the axis of rotation is between the near edge of the reflecting surface 602 and the far edge of the reflecting surface 602 as shown by revolving axis 614. The concave surface is at most a $\pi$ surface. The cross section of the beam is round if the revolving angle is $\pi$. An illustration of the optic and x-ray beam projection is provided in FIG. 7. The optic 710 has a convex portion 712 and a concave portion 714. To utilize the convex portion 712 of the optic 710, the x-ray source 716 must be a partial circle. This allows more flux to be directed to the sample without concentrating more energy into a small area of target on the x-ray source 716. A trace of the x-ray beam is denoted by reference numeral 718.

If the axis of rotation is at the near edge of the reflecting surface 602 as shown by axis of rotation 616, the reflecting surface 602 is a concave surface. The revolving angle is at most $\pi$. As such, the beam has a semi-circular cross section. If the axis of rotation is between the source 604 and the near edge of the reflecting surface 602 as shown by axis 618, the reflecting surface is a concave surface. The beam has a cross section of a partial ring with an inner diameter that is smaller than that provided by the typical case shown by revolving axis 620. If the revolving axis 620 passes through the origin of the source 604 and the focus 606 as the reflecting surface is an ellipsoidal surface. The beam has a cross section of a ring or a part of a ring.

Figure 8:
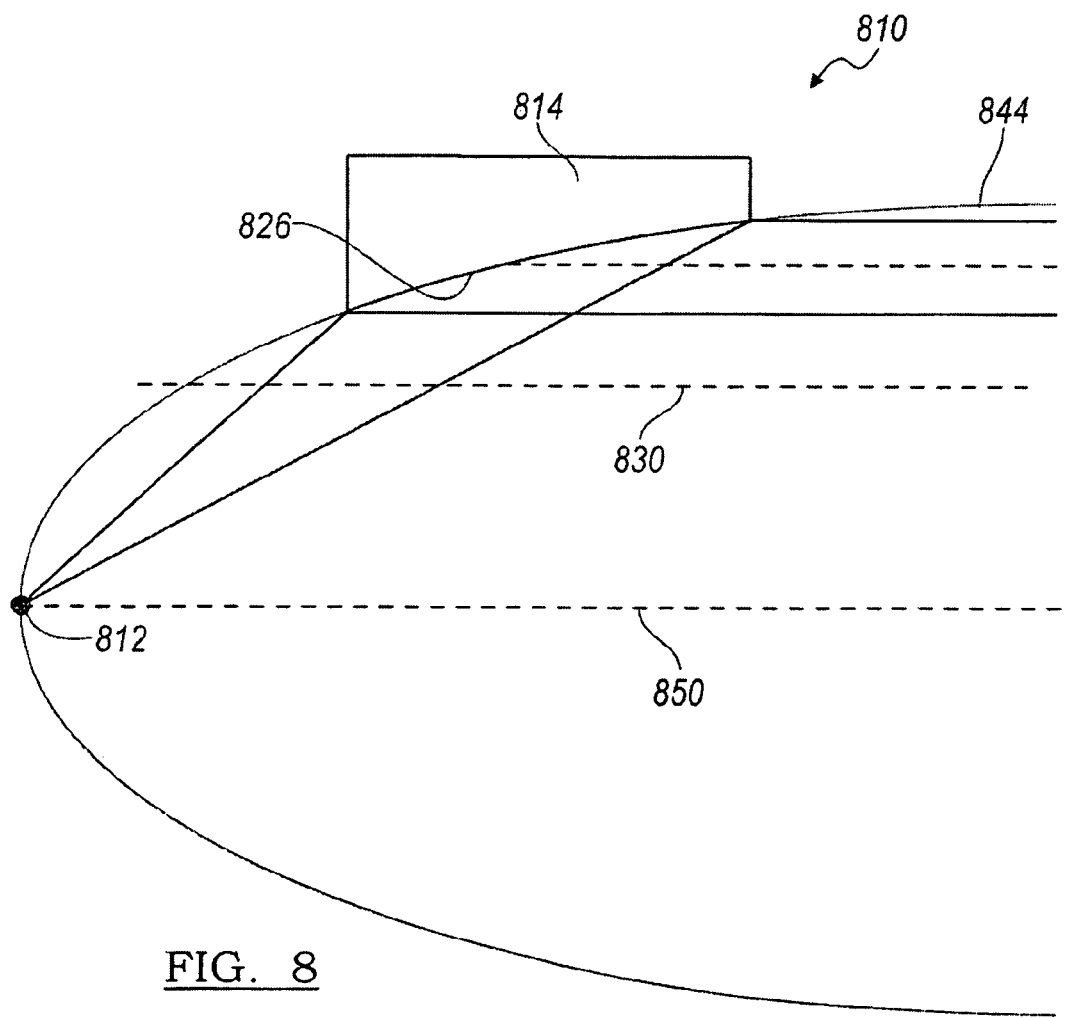
FIG. 8 is a schematic view of a parabolic x-ray optical system illustrating an axis of rotation different than the geometric axis of the optic.

A system 810 utilizing a parabolic surface is provided in FIG. 8. In a parabolic system, the origin of the x-ray source 812 is located at the origin of the parabola 844. Typical parabolic systems use an optic 814 with a surface 826 that is revolved about the geometric axis 850 of the surface 826. However, in the system according to this embodiment of the invention, the revolving axis 830 is different than the geometric symmetric axis 850 of the surface 826. As discussed above, this serves to substantially increase the flux delivered to the sample in an efficient and effective manner if the axis 830 is between the axis 850 and the optic. Axis 830 is in parallel to axis 850.

In x-ray analysis, being able to deliver multiple wavelengths or energies onto a sample may be useful. As such, the x-ray source 12 may be optionally configured to deliver a beam of multiple wavelengths or multiple energy.

Figure 9:
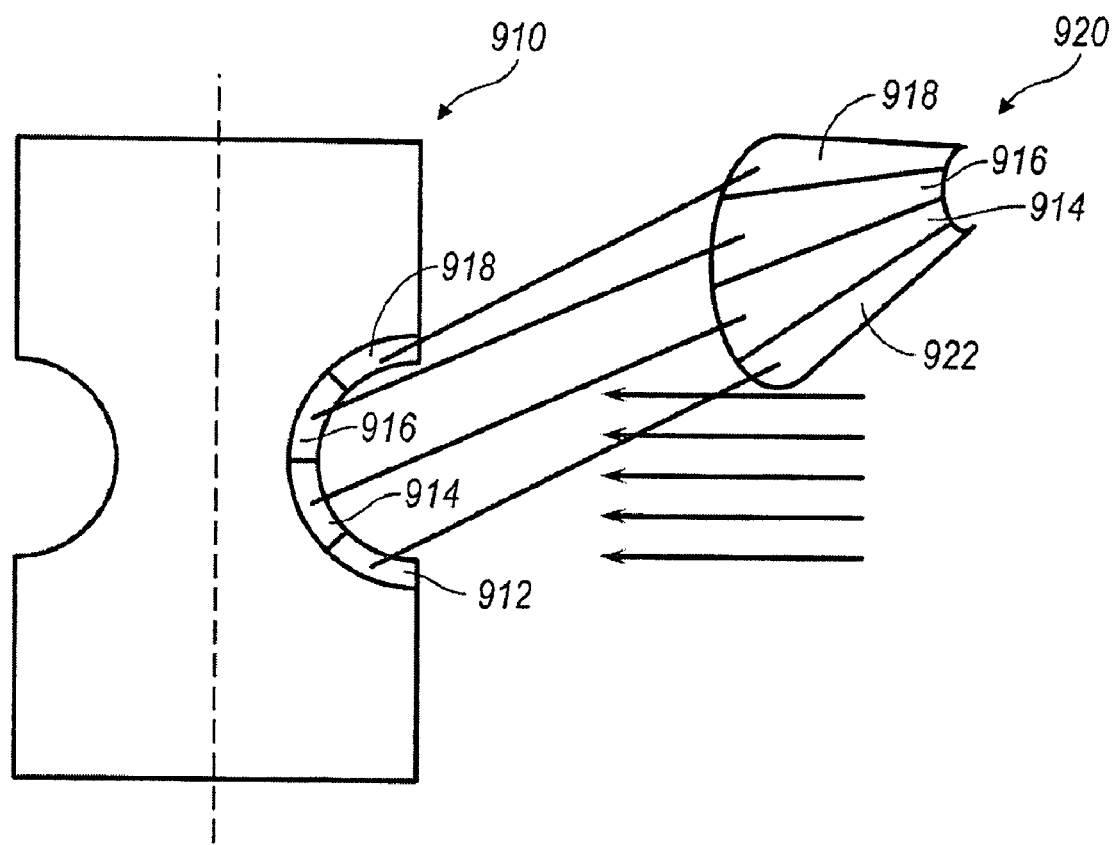
FIG. 9 is a schematic view of a multi energy or multi wavelength system.

Alternatively, the circular shaped source may be further segmented into multiple sections of different target materials, as shown in FIG. 9. For example, the target 910 has four sections 912, 914, 916, and 918 each made of a different material. Such a source-optic combination would deliver a beam of multiple wavelengths.

The optic 920 of a multiple wavelength system may be a total reflection optic in nature or a diffraction optic in nature, such as multilayer optics or crystal optics. If the reflection surface is in nature of the multilayer or crystal surfaces, the corresponding sections 922, 924, 926, and 928 for different energies will follow their Bragg's law governed contours and layer structures. In one example, the optic includes corresponding sections for different energies and each section follows Bragg's law with its own contour and coating structure which include layer thickness and variation of the layer thickness. In another example, each section has the same contour for each section but different coating structure for each section. In yet another example, each section of the optic has the same coating structure but different contours. In again another alternative example, the optic is a crystal optic with different sections, each of them has its own contour and crystal structure so that Bragg's law can be satisfied for its energy.

As a person skilled in the art will readily appreciate, the above description is meant as an illustration of implementation of the principles this invention. This description is not intended to limit the scope or application of this invention in that the invention is susceptible to modification, variation and change, without departing from the spirit of this invention, as defined in the following claims.

What is claimed is:

1. An x-ray optical system comprising:
   a source that emits an x-ray beam; and
   an optic that receives the beam from the source and directs the beam toward a sample to characterize the sample, the optic having an optical reflecting surface, the geometry of the optical reflecting surface being defined by revolving a defined contour around an axis that is different than the geometric symmetric axis of the contour.

2. The system of claim 1, wherein the axis is in plane with the geometric symmetric axis in any longitudinal cross section.

3. The system of claim 1, further comprising a detector that characterizes the sample.

4. The system of claim 1, wherein the source has at least a partial circular emission profile.

5. The system of claim 4, wherein the source has a full circular emission profile.

6. The system of claim 4, wherein the source is a large source therefore the at least a partial circular profile is embedded within the source.

7. The system of claim 1, wherein the reflecting surface is a concave surface.

8. The system of claim 7, wherein the source has an emission profile with a semi-circular cross section.

9. The system of claim 7, wherein the source has an emission profile with an at least partial ring cross section.

10. The system of claim 1, wherein the reflecting surface is a convex surface.

11. The system of claim 10, wherein the source has an emission profile with a ring cross section.

12. The system of claim 10, wherein the source has an emission profile with an at least partial circular cross section.

13. The system of claim 1, wherein the reflecting surface includes a convex portion and a concave portion.

14. The system of claim 1, wherein the source is a rotating anode.

15. The system of claim 1, wherein the source is a sealed tube x-ray generator.

16. The system of claim 1, wherein the source is a microfocusing source.

17. The system of claim 1, wherein the optic is a total reflection optic.

18. The system of claim 1, wherein the optic is a multilayer optic.

19. The system of claim 1, wherein the optic is a reflective crystal.

20. The system of claim 1 wherein the x-ray source is segmented into multiple sections of different target materials.

21. The system of claim 20, wherein the optic is a total reflection optic with corresponding sections for different energies.

22. The system of claim 20, wherein the optic is a multilayer optic with corresponding sections for different energies, each section follows Bragg's law with its own contour and coating structure which include coating material combinations, layer thickness and variation of the layer thickness.

23. The optic of claim 22, wherein the optic has the same contour for different sections but different coating structure.

24. The optic of claim 22, wherein the optic has the same coating structure but different contours.

25. The system of claim 20, wherein the optic is a crystal optic with different sections, each of them has its own contour and crystal structure so that Bragg's law can be satisfied for its energy.

26. An x-ray optical element comprising an reflecting surface configured to reflect an x-ray beam, the reflecting surface having a first contour along a first direction defined by a geometric shape, a second direction being perpendicular to the first direction, the reflecting surface having a second contour in the second direction defined by the first contour being revolved about an axis that is different from the geometric symmetric axis of the geometric shape.

27. The system of claim 26, wherein the axis is in plane with the geometric symmetric axis.

28. The system of claim 26, wherein the reflecting surface is a concave surface.

29. The system of claim 26, wherein the reflecting surface is a convex surface.

30. The system of claim 26, wherein the reflecting surface includes a convex portion and a concave portion.

31. A method for analyzing a sample including:
    generating an x-ray beam;
    directing the x-ray beam to a sample using an optic with a reflecting surface, the geometry of the reflecting surface being defined by revolving a defined contour around an axis that is different than the geometric symmetric axes of the optic;
    detecting the x-rays from the sample; and
    generating an electrical signal corresponding to the x-rays detected.

* * * * *